United States Patent [19]

Bonafe

[11] Patent Number: 4,937,571

[45] Date of Patent: Jun. 26, 1990

[54] SYSTEM FOR ELABORATING AN ALARM SIGNAL ON BOARD AN AIRCRAFT IN THE EVENT OF A MINI-TORNADO

[75] Inventor: Jean-Louis Bonafe, Toulouse, France

[73] Assignee: Aerospatiale Societe Nationale Industrielle, Paris, France

[21] Appl. No.: 320,098

[22] PCT Filed: Jun. 10, 1988

[86] PCT No.: PCT/FR88/00298

§ 371 Date: Jan. 6, 1989

§ 102(e) Date: Jan. 6, 1989

[87] PCT Pub. No.: WO88/10457

PCT Pub. Date: Dec. 29, 1988

[30] Foreign Application Priority Data

Jun. 18, 1987 [FR] France .............................. 87 08533

[51] Int. Cl.$^5$ .............................................. G08B 23/00
[52] U.S. Cl. .................................. 340/968; 73/178 T; 244/181; 340/963; 364/433
[58] Field of Search ....................... 340/966, 968, 963; 364/434, 435; 244/181, 182, 191; 73/178 T

[56] References Cited

U.S. PATENT DOCUMENTS

| 4,043,194 | 8/1977 | Tanner | 340/968 |
| 4,079,905 | 3/1978 | Greene | 340/968 |
| 4,725,811 | 2/1988 | Muller et al. | 244/181 |
| 4,728,951 | 3/1988 | Johnson et al. | 340/968 |
| 4,763,266 | 8/1988 | Schultz et al. | 340/968 |

FOREIGN PATENT DOCUMENTS 0125087 11/1984 European Pat. Off. .
0229197 7/1987 European Pat. Off. .

Primary Examiner—Joseph A. Orsino
Assistant Examiner—Brent A. Swarthout
Attorney, Agent, or Firm—Fisher, Christen & Sabol

[57] ABSTRACT

A system for elaborating, on board an aircraft, an alarm signal in the event of a mini-tornado, whereby an alarm threshold ($\alpha + \alpha w$) for mini-tornado is defined which is a function of the present incidence ($\alpha$) of the aircraft, incremented or decremented by incidence equivalents ($\alpha w$) corresponding to present and past winds and to present and past wind variations; and the mini-tornado alarm is triggered off when the compensated present incidence ($\alpha + \alpha w$) exceeds a critical threshold, taking the aircraft configuration into account.

10 Claims, 5 Drawing Sheets

SYSTEM FOR ELABORATING AN ALARM SIGNAL ON BOARD AN AIRCRAFT IN THE EVENT OF A MINI-TORNADO

BACKGROUND OF THE INVENTION

1. Field of the Invention

The present invention relates to a system for elaborating, on board an aircraft, an alarm signal in the event of a mini-tornado.

2. Background Art

"Mini-tornado" is understood to mean the meteorological disturbances commonly designated in aeronautics by the English words "windshear", "downburst" or "microburst".

Such mini-tornados are essentially constituted by violent descending eddying airstreams whose speed may be greater than 10 m/s and which present horizontal velocity components.

Although there is little probability that an aircraft will encounter such a mini-tornado during take-off or landing, nonetheless the danger exists that an aircraft pancakes on the ground by a mini-tornado during these flight phases, during which its safety margin is relatively sensitive. During the last twenty years, it is estimated that mini-tornados have been responsible for about thirty take-off and landing accidents, having caused more than 600 deaths.

The meteorological phenomenon of mini-tornados is of course detectable from the ground and it has already been thought to equip aerodromes with appropriate detectors, but experience has unfortunately proved that the detection of the mini-tornados on the ground, even with complex means, could not, at the present time, give an alarm in a sufficiently short time on board an aircraft to avoid all danger.

It has also already been thought to provide on board aircraft systems for detecting mini-tornados capable of delivering an alarm signal when the force thereof exceeds a predetermined threshold.

As will be seen hereinafter, the vertical and horizontal velocity components of airstreams are easy to calculate at all points of a mini-tornado, from the inertial, anemometric and incidence information delivered by the specialized equipment embarked on board modern aircraft. In the known systems mentioned above, said vertical and horizontal velocity components are thus exploited. However, this results in numerous untimely alarms. In fact, these known systems cannot take into account the energy of the aircraft, due essentially to the speed thereof, at the moment of measuring said velocity components of the air streams. Consequently, whether the aircraft moves slowly or quickly, the known alarm systems are triggered off for the same values of said components. Now, even when the triggering-off values of these components are exceeded, this may result in no danger for the aircraft if the latter has acquired a high energy.

BROAD DESCRIPTION OF THE INVENTION

It is an object of the present invention to overcome this drawback of the known detection systems. It relates to a system presenting a very high sensitivity of triggering off an alarm, but avoiding untimely alarms.

To that end, according to the invention, the system for elaborating on board an aircraft an alarm signal in the event of a mini-tornado, comprising a computer device allowing signals to be obtained representative of the velocities of the horizontal wind and of the vertical wind, to which said aircraft is subjected, from the information on velocities, trim and incidence delivered by the on-board equipment of said aircraft, is noteworthy in that it comprises:

- derivation means for calculating the derivative of the signal representative of said velocity of the horizontal wind with respect to time;
- first means for forming a first signal representative of the positive values of said derivative;
- second means for forming a signal representative of the negative values of said derivative;
- first summation means delivering a third signal obtained by the addition of said signal representative of said velocity of the vertical wind and said first and second signals and by the subtraction of said signal representative of the mean velocity of the horizontal wind during a period prior to that of the operations effected by said system;
- second summation means for forming the sum of said incidence information and of said third signal;
- means for comparing said sum and a predetermined threshold of incidence guaranteeing a minimum safety energy of the aircraft; and
- alarm means capable of emitting an alarm signal when said sum is greater than said predetermined threshold of incidence.

In this way, according to the invention, the horizontal velocity and vertical velocity components of the airstreams of a mini-tornado are taken into account by determining the velocity of the horizontal wind and the velocity of the vertical wind, respectively, in order, as will be explained in greater detail hereinafter, to determine a compensation incidence (said third signal), which, added to the present measurement of incidence, is compared with an alarm threshold. Thanks to the invention, it is therefore possible to take advantage of the fixed relation linking, for a determined aircraft in a determined configuration, the coefficient of lift and the incidence. This relation makes it possible to determine the angle of stall of this aircraft, angle of stall to which is attached a stalling speed. The present invention is based on the following observations:

- a considerable increase in the head wind is a precursor sign of a mini-tornado;
- when an aircraft encounters a mini-tornado, the effect of the latter is firstly carrying, before becoming offsetting;
- the variations in incidence, both positive and negative, imposed by a mini-tornado on an aircraft depend directly on the variations of the horizontal and vertical velocity components of the airstreams of the mini-tornado, with the result that the variations of these components are representative of variations in incidence and are therefore equivalents of incidence;
- said vertical velocity component is constantly directed downwardly and therefore constantly has an offsetting effect, with the result that its effect may be perceived thanks to its amplitude alone;
- said horizontal velocity component, on the contrary, corresponds firstly to a head wind, then to a tail wind, these winds passing through extremes. To study its effect, it is therefore necessary to perceive both its amplitude and its sign, which is effected in the system according to the invention by means of the derivative. It should be noted that this derivative, as a function of the foregoing, therefore corresponds to a gradient of incidence. This gradient of incidence is carrying when said derivative is positive and offsetting when said derivative is negative.

It is therefore seen that, according to the invention, said third signal is an incidence compensation signal composed of the sum of an equivalent of incidence (the first signal) due to a carrier gradient of said horizontal component, of an equivalent incidence (the second signal) due to an off-setting gradient of said horizontal component, and of an equivalent of incidence due to said vertical component, sum from which is subtracted an equivalent of incidence corresponding to the head wind which reached the aircraft before the measurement. In fact, the horizontal wind calculated by said computer device must, in order to signify the existence of a mini-tornado, be freed of the mean head wind, which must therefore be subtracted from the incidence compensation signal, with a view to avoiding untimely alarms. In order that this correction by elimination of the mean head wind be as precise as possible, the system according to the present invention preferably comprises means for delivering to said first summation means the mean value over several tens of seconds of the velocity of said horizontal wind.

Moreover, as a safety precaution, said system comprises limitation means making it possible to subtract from said third signal said mean value of the velocity of the horizontal wind only when the absolute value thereof is less than said mean value of the positive values of said derivative.

Furthermore, in order to render sensitive the triggering off of the alarm for a momentary variation of said horizontal component, it is preferably provided that said first signal delivered by said first means corresponds to the mean value over several seconds of the positive values of said derivative, said mean being established with a time constant less than that of its cancellation.

In order to avoid untimely operations of the system according to the invention during flight phases where this would be undesirable, said system comprises, between said computer device on the one hand, and said derivation means, said first and second means and said first summation means on the other hand, controlled interruption means, open when said aircraft is not in take-off or landing phase. For compensation in incidence brought by the system of the invention to depend on the urgency of the danger to the aircraft due to the mini-tornado, an amplifier, whose gain is variable as a function of the altitude of the aircraft, may be disposed between said first and second summation means.

Moreover, in order to know the magnitude of the compensation in incidence and possibly to use this information during processing of the alarm signal, means may be provided for comparing said incidence information and said third signal.

Said predetermined incidence threshold preferably corresponds to a speed of the aircraft greater by at least 10% than the stalling speed of the aircraft and the value of said predetermined incidence threshold depends on the configuration of the mobile aerodynamic surfaces of the aircraft.

For example, this threshold is equal to 1.1 times the stalling speed in the configuration of take-off and to 1.2 times said stalling speed in the configuration of landing. Being given that an aircraft is more sensitive at landing than at take-off, the value of said threshold is chosen to be greater for landing than for take-off.

The system according to the invention is advantageously incorporated in a computer on board the aircraft and its operation is sequential, with the result that the compensation incidence is continually adapted to the flight conditions present in the aircraft.

It is thus seen that, according to the invention:
an alarm threshold for mini-tornado is defined which is a function of the present incidence of the aircraft, incremented or decremented by incidence equivalents corresponding to present and past winds and to present and past wind variations; and
the mini-tornado alarm is triggered off when the present compensated incidence exceeds a critical threshold, taking the configuration of the aircraft into account.

BRIEF DESCRIPTION OF THE DRAWINGS

The Figures of the accompanying drawings clearly show how the invention may be carried out. In these Figures, identical references designate like elements.

DETAILED DESCRIPTION OF THE DRAWINGS

Figure 1:
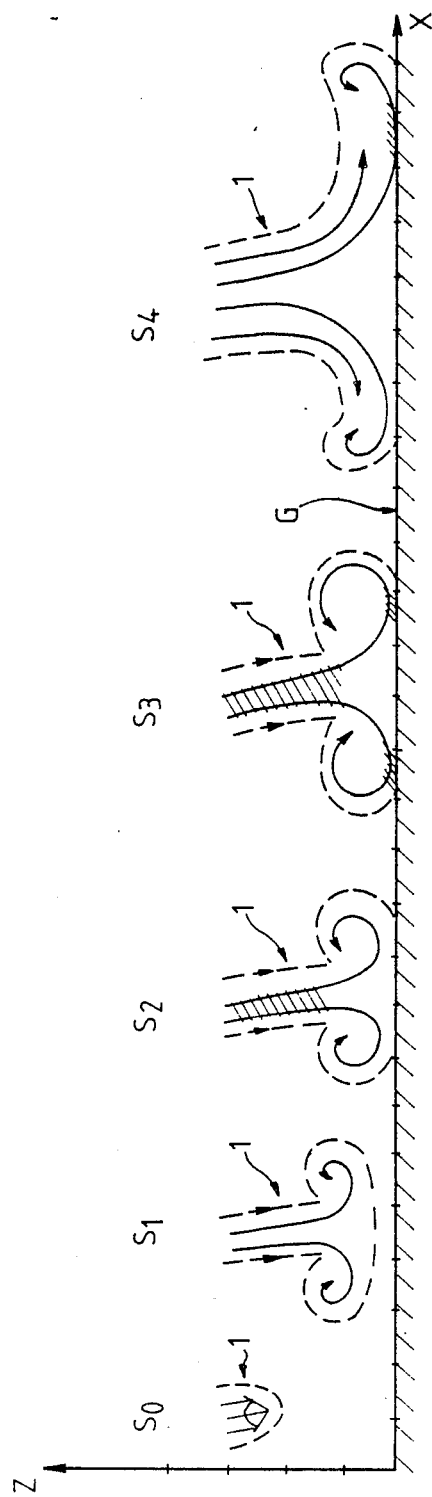
FIG. 1 schematically shows a mini-tornado at different stages of its development in the vicinity of the ground.

FIG. 1 schematically shows, in five stages S0 to S4 of its development, a mini-tornado 1, which the system according to the invention is intended to detect. In the diagram of FIG. 1, axes OX and OZ are respectively horizontal and vertical, axis OX being at the level of ground G. To render the drawing clearer, the five stages of the development of the mini-tornado 1 have been shown spread along the horizontal axis OX, but it goes without saying that this drawing arrangement is arbitrary and might be different. On the other hand, on axes OX and OY, lines equidistant by 1 km have been indicated in order to give the scale of the phenomenon. Such a mini-tornado 1 is constituted by descending streams which, after the initial stage of formation S0, diverge, eddying towards the ground until they strike said latter. The hatched parts of these streams correspond to speeds greater than 10 m/s. If T2 designates the instant at which stage S2 is produced, when the mini-tornado 1 attains the ground, stages S0 and S1 may correspond respectively to instants T2−5 mn and T2−2 mn, whilst stages S3 and S4 may correspond respectively to instants T2+5 mn and T2+10 mn.

It is thus seen that, especially at stages S2 and S3, an aircraft passing through a mini-tornado 1 risks violently pancaking on ground G.

Figure 2A:
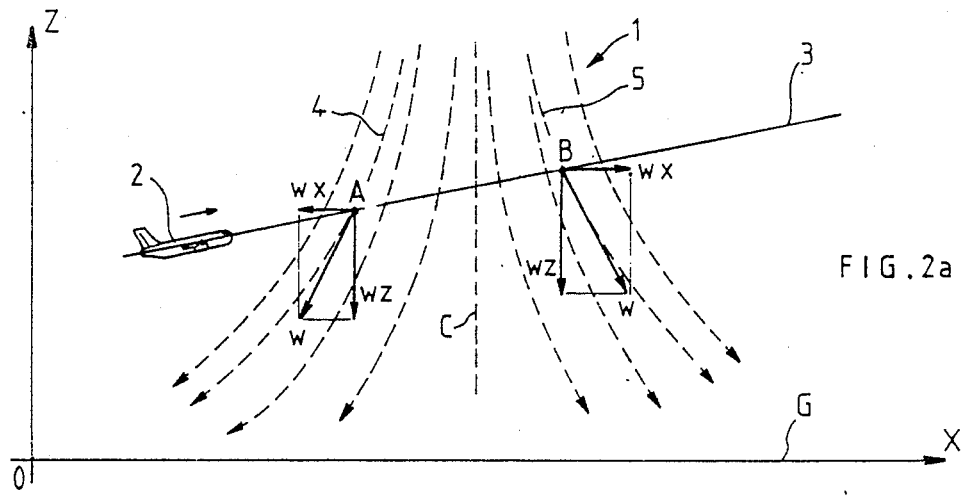
FIGS. 2a, 2b and 2c schematically illustrate the vertical and horizontal components of the velocity of the airstreams along the path of an aircraft passing through a mini-tornado.
Figure 2B:
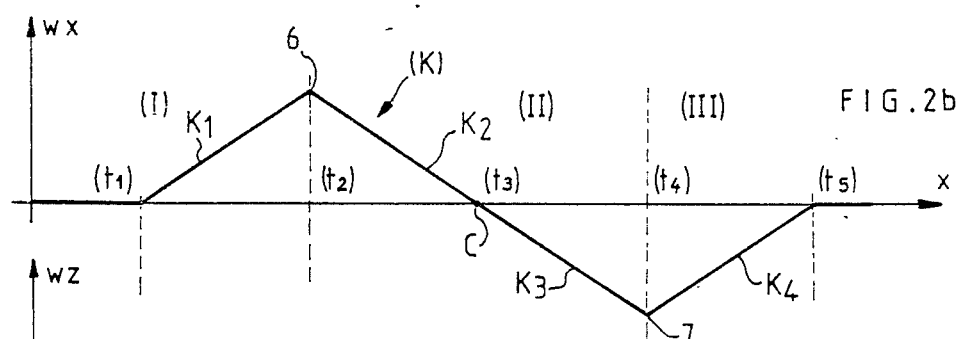
Figure 2C:
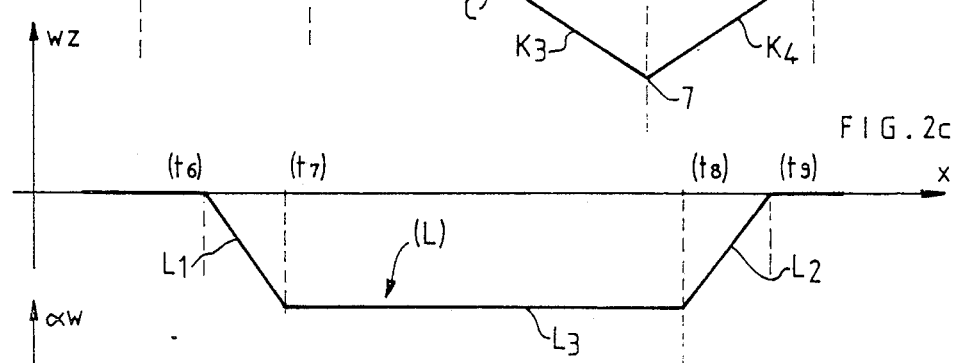

The diagrams of FIGS. 2a, 2b and 2c enable the effects of a mini-tornado 1 on an aircraft 2 whose path 3 traverses said mini-tornado, to be more readily understood. In these Figures, it is assumed that the aircraft 2 moves from left to right. At any point A or B of the mini-tornado 1, the aircraft 2 is subjected by the latter to the action of air streams 4, 5 having a velocity W, whose direction is tangential to said airstreams 4 or 5 passing through this point A or B, said velocity W being oriented towards the ground G, but inclined towards the outside of said mini-tornado 1 with respect to said ground. This inclination of the velocity W towards the outside of the mini-tornado 1 results from the divergent structure of the airstreams thereof. Consequently, if the speed W is decomposed into a horizontal component WX and a vertical component WZ, these components are constantly and respectively directed towards the outside of the mini-tornado and towards the ground.

Therefore, when the aircraft 2 moves from outside the mini-tornado towards the centre C thereof, this results in the horizontal component WX behaving as head wind, whilst, when the aircraft 2 moves from the centre C of the mini-tornado towards the outside thereof, this horizontal component WX behaves as tail wind. Of course, in the centre C of the mini-tornado, the component WX is cancelled to allow reversal of direction. Moreover, between the periphery of the mini-tornado 1 and the centre C thereof, the amplitude of the horizontal component WX is firstly increasing and then decreasing. Consequently, if the development of component WX with respect to aircraft 2 is shown extremely schematically, considering this component as being positive or negative, respectively when it corresponds to a head wind and to a tail wind, a curve as designated by (K) in FIG. 2b is obtained.

When the aircraft 2 penetrates the mini-tornado 1, (instant t1), the component WX, which it receives from the front, begins to increase (part K1 of curve (K)), then, from a certain penetration inside said tornado corresponding to a point 6 (instant t2), decreases although remaining from the front (part K2 of curve (K)). When the aircraft 2 attains the vicinity of centre C of the mini-tornado 1 (instant t3), the amplitude of component WX is cancelled. The aircraft moving from this centre C towards the outside of the mini-tornado 1, the component WX which has changed sign to become a tail wind, then takes an increasing negative amplitude (part K3 of the curve (K)). From a certain approach of the periphery of the mini-tornado 1 corresponding to a point 7 (instant t4), the negative amplitude of the component WX, which still behaves as a tail wind, decreases (part K4 of curve (K)), until it becomes zero outside the mini-tornado 1 (instant t5).

It is thus seen that the passage through the mini-tornado 1 by the aircraft 2 may be divided into three zones (cf. FIG. 2b), viz:
  a zone (I), corresponding to part K1 of curve (K), in which the head wind increases, which generates a carrier effect;
  a zone (II), corresponding to parts K2 and K3 of curve (K), in which the head wind decreases, then becomes an increasing tail wind, which, in both cases, generates an offsetting effect; and
  a zone (III), corresponding to part K4 of the curve (K), in which the tail wind decreases, which generates a carrier effect.

If, similarly to what has been schematically done hereinabove for the horizontal component WX of velocity W, the development of the vertical component WZ of this velocity along the path 3 of the aircraft 2 in the mini-tornado 1 is plotted, the curve (L) of FIG. 2c is obtained. This curve (L) is composed of two end parts L1 and L2, corresponding respectively to the increase and to the decrease in the negative amplitude of WZ on the periphery of the mini-tornado, and of an intermediate part L3 which corresponds to the major part of the passage of the mini-tornado and in which the negative amplitude of WZ is substantially constant.

The curve part L1, i.e. the increase of the negative amplitude of the component WZ, begins at an instant t6, delayed with respect to instant t1. Similarly, the curve part L2, i.e. the decrease in the negative amplitude of component WZ, terminates at an instant t9, prior to instant t5. t7 and t8 respectively designate the instants at which parts L1 and L3 and parts L3 and L2 join.

For reasons of simplification and schematization, parts K1 to K4 of curve (K) and parts L1 to L3 of curve (L) have, in FIGS. 2b and 2c, been shown in the form of segments of straight line.

Figure 3A:
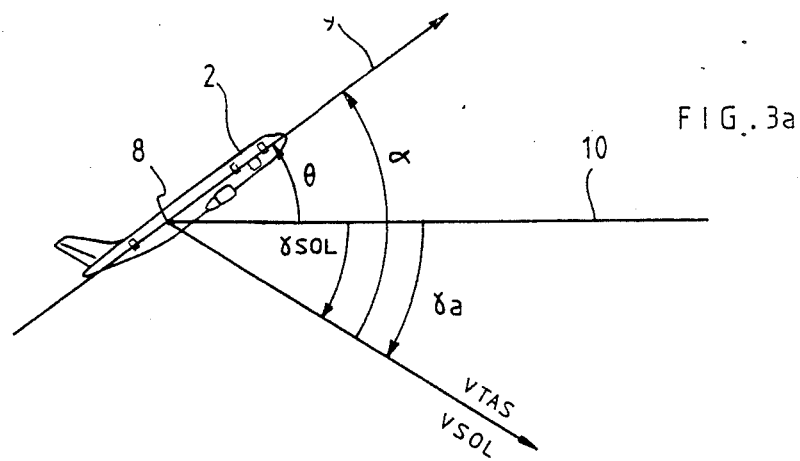
FIGS. 3a, 3b and 3c show the charts of the speeds concerning an aircraft before and during passage through a mini-tornado.

FIG. 3a shows the chart of the speeds, applied at the centre of gravity 8 of the aircraft 2 before encountering the tornado 1. In this FIG. 3a, the longitudinal axis 9 of the aircraft 2 is inclined from the trim $\theta$ with respect to the line of horizon 10 (parallel to axis OX) and presents the incidence $\alpha$ with respect to the aerodynamic speed VTAS, which itself is inclined from the climb gradient $\nu a$ with respect to the line of horizon 10. In that case, the VSOL speed of the aircraft 2 with respect to ground G is merged with the aerodynamic speed VTAS.

When aircraft 2 receives a vertical wind and a horizontal wind, for example because it is located in the mini-tornado 1, these vertical and horizontal winds, or components WX and WY, occur and must be composed with VTAS and VSOL. Since the configuration of the aircraft 2 is not modified, the trim $\theta$ remains constant, whilst the speed VSOL and its gradient $\nu$SOL with respect to the line of horizon 10 are unchanged. This results in that the aerodynamic incidence $\alpha$ and the climb gradient $\nu a$ vary and that the aerodynamic speed VTAS is no longer merged with VSOL.

Figure 3B:
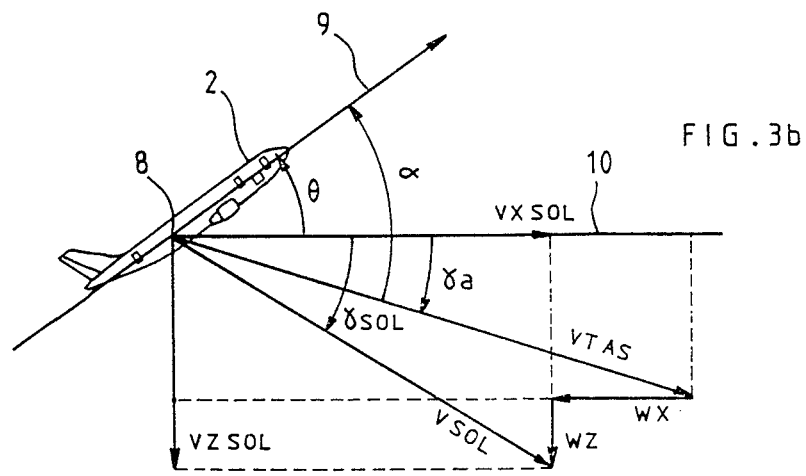

If, as shown in FIG. 3b, the component WX behaves as a head wind, the aerodynamic incidence $\alpha$ becomes less than in the case of FIG. 3a. In addition, this FIG. 3b shows that, if WX increases in amplitude, the aerodynamic incidence $\alpha$ decreases, and vice versa.

Consequently, in zone (I) of FIG. 2b, when WX develops in the increasing part K1 of curve (K) with a positive derivative dWX/dt, the result is a negative variation $\Delta\alpha$ of the incidence $\alpha$ (carrier effect). On the other hand, in zone (II) of FIG. 2b, when WX follows the decreasing curve part K2 with a negative derivative dWX/dt, there follows a positive variation $\Delta\alpha$ of the incidence $\alpha$ (off-setting effect).

Similarly to what precedes, if the speeds VSOL, WX, WZ and VTAS are composed in the case of X behaving as a tail wind (cf. FIG. 3c), it is ascertained that, if WX increases in amplitude, the aerodynamic incidence $\alpha$ increases and vice versa.

Consequently, in zone (II) of FIG. 2b, when WX follows the decreasing curve part K3 with a negative derivative dWX/dt, the result is a positive variation $\Delta\alpha$ of the incidence α (off-setting effect). On the other hand, when WX follows the increasing part K4 of the curve (K), the derivative dWX/dt is positive and the variation Δα of the incidence α is negative (carrier effect).

Thus, in all cases, it is observed that, when dWX/dt is positive, Δα is negative, and vice versa.

Figure 3C:
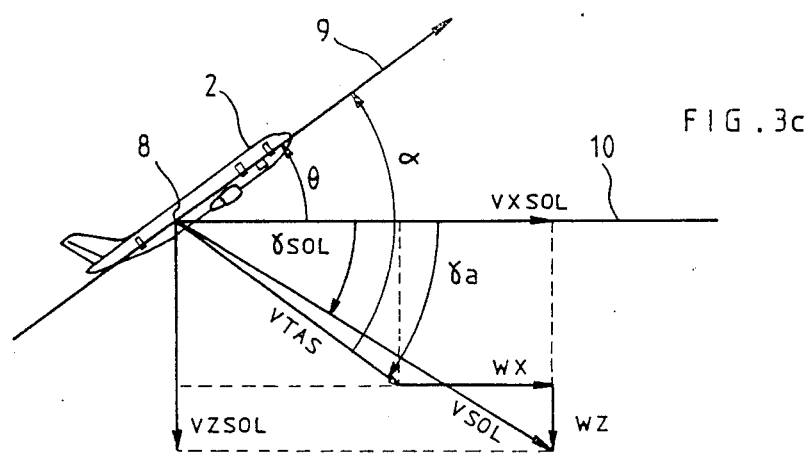

From the foregoing, and in particular from the comparison of FIGS. 3a, 3b and 3c, it follows that the encounter of the aircraft 2 with a mini-tornado 1 firstly brings about a decrease in the aerodynamic incidence α of said aircraft, followed by a considerable increase of said incidence.

Moreover, these FIGS. 3a to 3c show that WX is equal to the difference between the projections on the horizontal axis (or line of horizon 10) of the aerodynamic speed VTAS and of the speed VSOL with respect to the ground and that, similarly, WZ is equal to the difference between the projections on the vertical axis OZ of the speed VSOL and of the aerodynamic speed VTAS. VXSOL and VZSOL respectively designate the projections of VSOL on axis OX and on axis OZ.

Figure 4:
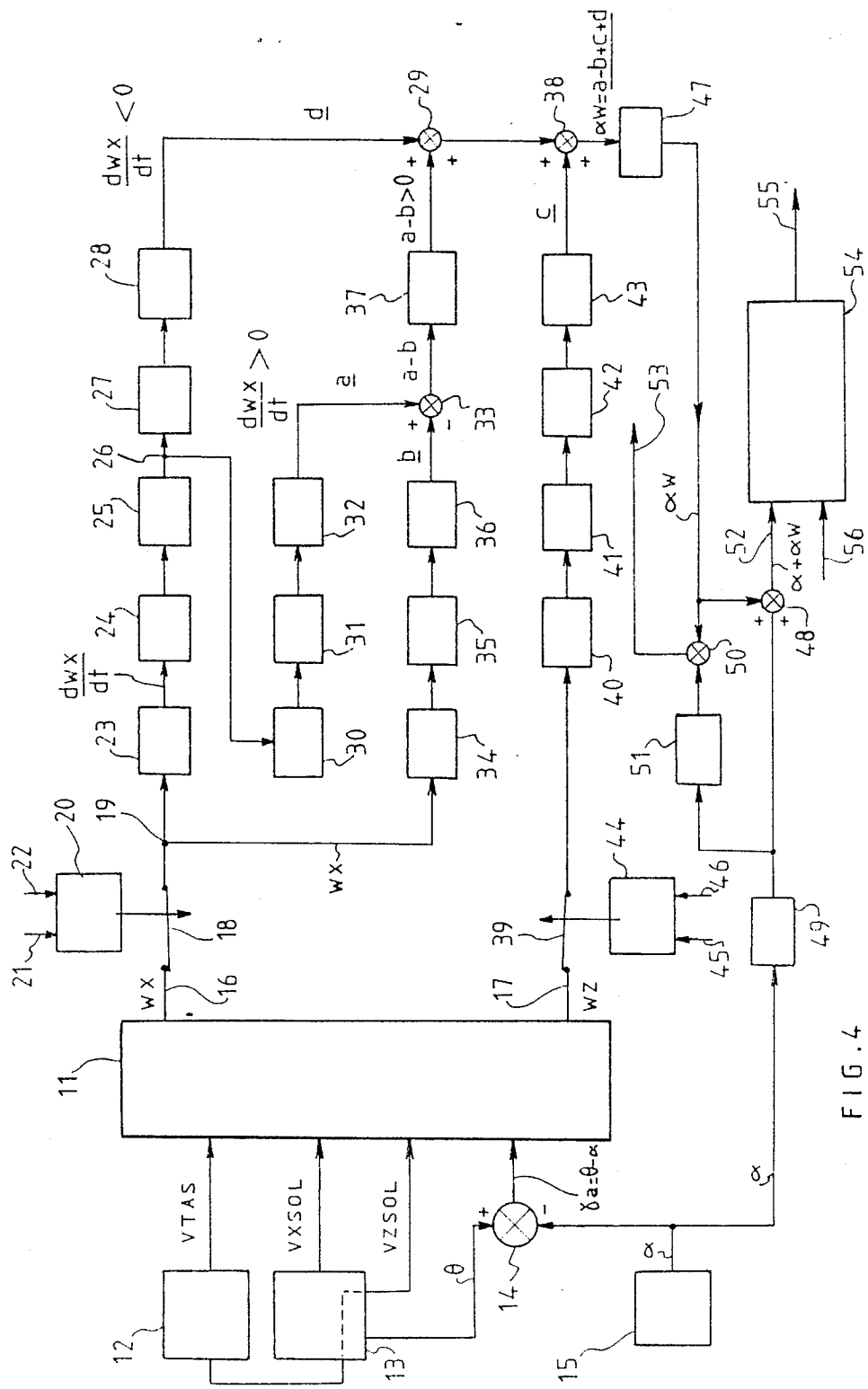
FIG. 4 is a block diagram of an embodiment of the system according to the present invention.

The system according to the invention, shown schematically in FIG. 4, comprises a computer device 11 capable of determining, at each instant, the speeds of the horizontal wind and of the vertical wind received by the aircraft 2, and therefore the components WX and WZ when the latter encounters the tornado 1. To that end, the computer device 11 receives, for example:

- the aerodynamic speed VTAS coming from the anemometric system 12 provided on board the aircraft 2;
  - the VXSOL and VZSOL components (the latter component being the vertical baro-inertial speed) of the speed VSOL of the aircraft 2 with respect to the ground, delivered by the inertial system 13 on board;
  - the climb gradient va, furnished by a subtractor 14, receiving, on the one hand, the trim θ delivered by the inertial system 13 and, on the other hand, the aerodynamic incidence α delivered by the incidence sensors 15, mounted on board said aircraft 2. The subtractor 14 effects the operation va=θ−α.

Referring to the diagrams of FIGS. 3b and 3c, it is seen that the computer device 11 easily determines the components WX and WZ from the data VTAS, VXSOL, VZSOL and va which are addressed thereto in the manner mentioned hereinabove. The device 11 delivers the components WX and WZ, respectively at its outputs 16 and 17.

The output 16 of the computer device 11 at which the horizontal component WX appears, is connected, via a controlled switch 18, to a terminal 19. This switch 18 is controlled by a logic device 20 so as to be open if the speed of the aircraft 2 is less than a low speed threshold, for example of 180 km/hr (i.e. if the aircraft 2 is taxiing on the ground) or if the altitude of the aircraft 2 is greater than an altitude threshold (for example of the order of 400 m) significant of the fact that the aircraft is not in a phase of landing or of take-off. On the other hand, the switch 18 is maintained closed by the logic device 20 when these two conditions are not complied with, i.e. when the aircraft is near the ground, but has not yet touched or left it. In order to be able to operate, the logic device 20 receives, via a link 21, altitude information coming from the anemometric device 12.

Downstream of the terminal 19, the component WX is applied to the input of a derivative circuit 23, capable of furnishing at its output the derivative dWX/dt of said component WX with respect to time t. This derivative is then filtered by a filter 24 and shaped by a device 25.

At the output 26 of the shaping device 25, the derivative dWX/dt is, if it is negative, amplified by an amplifier 27, then addressed to a limiter 28, which limits the extreme values thereof, and finally to one of the inputs of an adder 29.

On the other hand, if, at the output 26 of the shaping device 25, the derivative dWX/dt is positive, it is amplified by an amplifier 30, limited in its extreme values by a limiter 31 and filtered by a filter 32, before being addressed to the positive input of a subtractor 33. The time constant of the filter 32, for example of the order of 13 s, is chosen to be sufficiently long for the filtering obtained to constitute a memorization of several seconds of the value dWX/dt.

Furthermore, the terminal 19 is connected to an amplifier 34 charged with amplifying the component WX, which is then filtered by filter 35, then limited in its extreme values by the limiter 36. The value of the time constant of the filter 35, for example of the order of 30 s, is chosen to be sufficiently long for the filtering obtained to constitute a memorization of several tens of seconds of WX. WX is then addressed by the limiter 36 to the negative input of the subtractor 33. A limiter 37, allowing only the positive balances of the subtractions effected by the subtractor 33 to pass, addresses this positive balance to another positive input of the adder 29. The output of the latter is joined to a positive input of another adder 38.

Moreover, the output 17 of the computer device 11, at which the vertical component WZ appears, is joined, via a controlled switch 39, a filter 40, a shaping device 41, an amplifier 42 and a limiter 43, to another positive input of the adder 38, which can thus receive said filtered, shaped, amplified and limited, vertical component WZ. The switch 39 is controlled by a logic device 44, so as to be open if the landing gear of the aircraft 2 is loaded (i.e. if the aircraft is in contact with the ground) or if the altitude of the aircraft 2 is greater than an altitude threshold (for example of the order of 400 m) significant of the fact that the aircraft 2 is not in a phase of take-off or of landing. Consequently, the logic device 44 receives, via a link 45, pressure information delivered by sensors (not shown) mounted on the landing gear of the aircraft 2 and, by a link 46 (similar to link 22 of the logic device 20), altitude information coming from the anemometric device 12.

The signal appearing at the output of the adder 38 is amplified by an amplifier 47, then addressed to one positive input of an adder 48 of which another positive input receives, furthermore, after filtering by a filter 49, the incidence value measured by the incidence sensors 15. Moreover, in a comparator 50, the output signal of the adder 38 is compared with the incidence signal issuing from the filter 49 and amplified by an amplifier 51.

The signal appearing at the output 52 of the adder 48, and possibly the one appearing at the output 53 of the comparator 50, are addressed to an alarm signal processing device 54 capable of delivering an alarm signal at its output 55. The device 54 receives, in addition, at an input 56, information concerning the state of the edges and flaps of the wings of the aircraft 2, and coming either from sensors or from an on-board computer (not shown).

Figure 5:
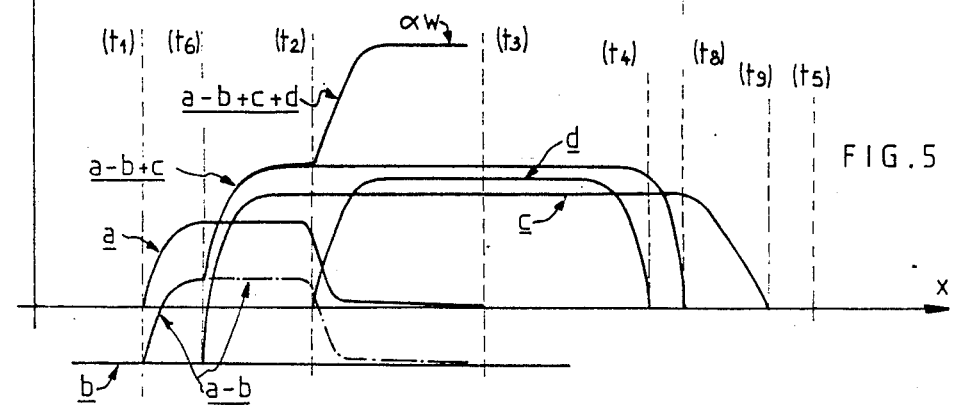
FIG. 5 is a diagram illustrating the formation of the incidence compensation signal according to the present invention.

The operation of the system of FIG. 4 will now be explained with the aid of the comments made hereinabove with regard to FIGS. 2a, 2b, 2c and 3a, 3b, 3c. FIG. 5, with regard to FIGS. 2a, 2b and 2c, illustrates the operation of said system of FIG. 4.

When the aircraft 2 penetrates the mini-tornado 1 (instant t1), it begins by encountering a carrier component WX (part K1 of curve (K)) with a positive derivative dWX/dt which will last during the passage of region (I) and which behaves as a carrier incidence gradient. Consequently, the circuit branch 24, 25, 26, 30, 31 and 32 applies to the positive input of the subtractor 33 the signal a illustrated in FIG. 5. From this signal a is subtracted, by the subtractor 33, the component WX memorized by the filter 35 and represented by the signal b of FIG. 5. Consequently, at the output of the subtractor 33, and therefore at the corresponding input of the adder 29, the signal a–b appears. When, later, (instant t6), the component WZ appears which increases along L1, the circuit 40–43 applies to the corresponding positive input of the adder 38 a signal c. Furthermore, at instant t2, the derivative dWX/dt becomes negative and the branch 27–28 delivers at the corresponding input of the adder 29 a signal d.

Consequently, at the output of adder 38, there appears an incidence compensation signal $\alpha w$ which is composed (cf. FIG. 5):
of signal a–b between instants t1 and t6;
of signal a–b+c between instants t6 and t2; and
of signal a–b+c+d after instant t2.

Figure 6:
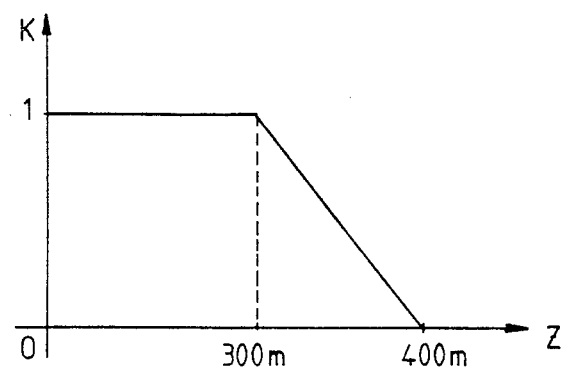
FIG. 6 shows an example of variation of amplification gain applied to the incidence compensation signal as a function of the altitude of the aircraft.

The incidence compensation signal $\alpha w$ is amplified by amplifier 47. The gain K of said amplifier 47 is advantageously a function of the altitude of the aircraft 2 in order not to trigger off an untimely alarm when the aircraft is located at an altitude at which it does not risk pancaking on the ground by the mini-tornado 1. FIG. 6 shows an example of variation of the gain of said amplifier 47: this gain is constant and for example equal to 1, between 0 and 300 m altitude and varies linearly from 1 to 0 between 300 m and 400 m altitude, and vice versa. To that end, the amplifier 47 is of the variable gain type and this gain is controlled by the anemometric device 12.

Figure 7:
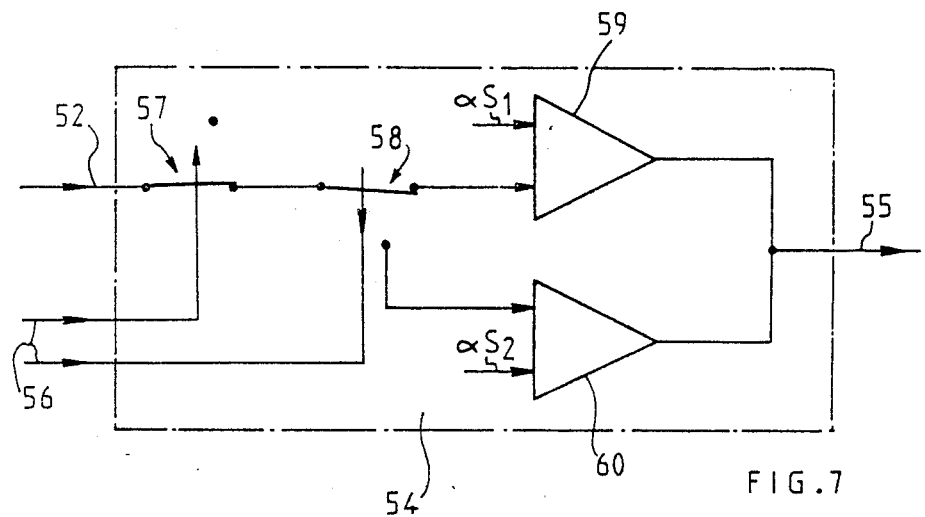
FIG. 7 is a block diagram of an embodiment of the device for elaborating the alarm signal.

FIG. 7 shows an embodiment of the signal processing device 54. In this example, the difference between the incidence information $\alpha$ and the incidence compensation signal $\alpha w$ given by the comparator 50 is not taken into consideration.

The device 54 of FIG. 7 comprises a controlled switch 57 and a controlled switch 58, mounted in series and connected to the input 52 on which signal $\alpha + \alpha w$ appears. The switch 57 is controlled by the input 56 so as to be open, when all the edges and flaps are retracted (smooth configuration of cruise flight) and to be closed when the flaps and edges are extended, with a view to take-off or landing. Furthermore, the switch 58 is controlled by the input 56 so as to ensure connection between input 52 and either one of the inputs of a comparator 59, when the configuration of the edges and flaps corresponds to a landing of the aircraft 2, or one of the inputs of a comparator 60, when the configuration of the edges and flaps corresponds to take-off of the aircraft 2. The other inputs of the comparators 59 and 60 respectively receive a threshold $\alpha S1$ or $\alpha S2$, corresponding respectively to a predetermined stalling incidence in the event of a mini-tornado, respectively during landing and during take-off. The outputs of the comparators 59 and 60 are connected to the output 55.

Figure 8:
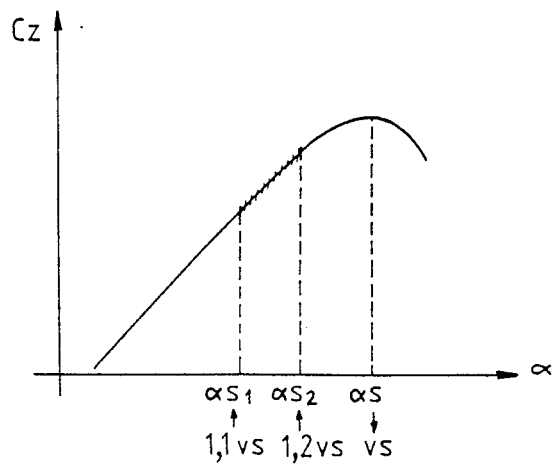
FIG. 8 is a diagram illustrating the process of choice of the incidence thresholds.

FIG. 8 shows the well known curve giving, for a determined configuration of a determined aircraft, the coefficient of lift Cz as a function of the incidence $\alpha$. In known manner, this curve makes it possible to determine the incidence $\alpha S$ at which the aircraft 2 stalls, this stalling incidence $\alpha S$ corresponding to a stalling speed VS.

In order to determine the thresholds $\alpha S1$ and $\alpha S2$ applied to the comparators 59 and 60, one begins by fixing, as a function of the stalling speed VS, a limiting speed VL, for example equal to 1.1 VS or 1.2 VS, beneath which there is a risk of stalling in landing or take-off configuration respectively, and, with the aid of the curve of FIG. 8, the respective incidence thresholds $\alpha S1$ and $\alpha S2$ to be applied to comparators 59 and 60 are determined.

In this way, as a function of the landing or take-off configuration, the signal $\alpha + \alpha w$ is compared with the threshold $\alpha S1$ or with threshold $\alpha S2$. The signal appearing at the output 55 is representative of the result of this comparison and, as soon as the signal $\alpha + \alpha w$ becomes equal to $\alpha S1$, or $\alpha S2$ respectively, it constitutes the alarm signal indicating that the mini-tornado is endangering the stability of the aircraft 2.

What is claimed is:

1. System for elaborating on board an aircraft alarm signal in the event of a mini-tornado, comprising a computer device (11) which obtains signals representative of the velocities of the horizontal wind and of the vertical wind, to which said aircraft is subjected, from information on velocities, trim and incidence delivered by the on-board anemometric system (12), inertial system (13) and aerodynamic incidence sensors (15), respectively, of said aircraft, characterized in that is comprises:
derivation means (23, 24, 25) for calculating the derivative of the signal representative of said velocity of the horizontal wind with respect to time;
first means (30, 31, 32) for forming a first signal representative of the positive values of said derivative;
second means (27, 28) for forming a second signal representative of the negative values of said derivative;
first summation means (29, 33, 38) delivering a third signal obtained by the addition of said signal representative of said velocity of the vertical wind and said first and second signals and by the subtraction of a signal representative of the mean velocity of the horizontal wind during a period prior to that of the operations effected by said system;
second summation means (48) for forming the sum of said incidence information and of said third signal;
means for comparing said sum and a predetermined threshold of incidence guaranteeing a minimum safety energy of the aircraft; and
alarm means capable of emitting an alarm signal when said sum is greater than said predetermined threshold of incidence.

2. System according to claim 1, characterized in that it comprises means (34, 35, 36) to deliver to said first summation means (29, 33, 38) the mean value over several tens of seconds of said horizontal wind speed.

3. System according to claim 2, characterized in that it comprises limitation means (37) making it possible to subtract from said third signal, said mean value of the horizontal wind speed, only when the absolute value thereof is less than the mean value of the positive values of said derivative.

4. System according to claim 1, characterized in that said first signal delivered by said first means corresponds to the mean value over several seconds of the positive values of said derivative, said mean value being established with a time constant less than that of said several seconds.

5. System according to claim 1, characterized in that it comprises, between said computer device (11), on the one hand, and said derivation means, said first and second means and said first summation means, on the other hand, controlled switch means open when said aircraft is not in take-off or landing phase.

6. System according to claim 1, characterized in that an amplifier, whose gain is variable as a function of the altitude of the aircraft (2), is disposed between said first and second summation means.

7. System according to one of claims 1 or 6, characterized in that it comprises means for comparing said incidence information and said third signal.

8. System according to claim 1, characterized in that said predetermined incidence threshold corresponds to a speed of the aircraft higher by at least 10% than the stalling speed of the aircraft.

9. System according to one of claims 1 or 8, characterized in that the value of said predetermined incidence threshold depends on the configuration of the mobile aerodynamic surfaces of the aircraft.

10. System according to claim 9, characterized in that the value of said predetermined incidence threshold is chosen to be greater for landing than for take-off.

* * * * *